United States Patent Office 2,709,712
Patented May 31, 1955

2,709,712

SYNTHESIS OF VITAMIN A-ACTIVE POLYENES

John D. Cawley and Charles D. Robeson, Rochester, N. Y., assignors to Eastman Kodak Company, Rochester, N. Y., a corporation of New Jersey No Drawing. Application April 22, 1950,
Serial No. 157,626

6 Claims. (Cl. 260—617)

This invention relates to methods of synthesizing polyene material characterized by vitamin A biological activity.

A number of materials having vitamin A biological activity are known. These materials are characterized by the conjugated polyene structure

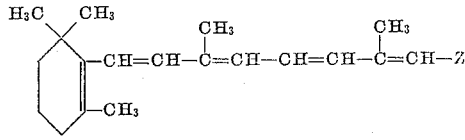

and include, for example, vitamin A alcohol wherein Z is the group —CH₂OH; vitamin A acid wherein Z is —COOH; vitamin A esters wherein Z is —COOR; and vitamin A ethers wherein Z is —CH₂OR. The synthesis of vitamin A-active materials is rendered difficult by the necessity of obtaining the basic methyl-substituted conjugated polyene system. The synthesis is further complicated by the inherent instability of such complex polyenes with a resultant tendency towards objectionable decomposition and undesirable side reactions.

It is an object of this invention to provide a new and useful method of synthesizing polyene material having vitamin A biological activity.

It is a further object of this invention to provide an improved method of building conjugated polyene systems.

Another object of the invention is to provide an economically feasible method of synthesizing vitamin A-active material in good yield.

Another object of the invention is to provide a synthesis of vitamin A comprising a new combination of method steps.

Another object of the invention is to minimize objectionable decomposition and undesirable side reactions in the synthesis of vitamin A.

Another object of the invention is to provide a new method of converting ionylic compounds to vitamin A.

Another object of the invention is to provide a new method of increasing the chain length of β-ionylidene acetaldehyde.

Another object of the invention is to provide a commercially feasible method of synthesizing vitamin A from available chemical materials.

Other objects will be apparent from the description and claims which follow.

These and other objects are attained by means of this invention as described more fully hereinafter; the syntheses embodying the invention including condensing β-ionylidene acetaldehyde with β-methyl glutaconic anhydride, converting the resulting anhydride condensation product to a vitamin A α,γ-diacid, and converting the diacid to the desired vitamin A-active material. In a preferred embodiment, β-ionone is converted to β-ionylidene acetaldehyde which is thereafter condensed with β-methyl glutaconic anhydride, and the anhydride condensation product is converted to the desired vitamin A-active material by methods including first converting the anhydride condensation product to the corresponding α,γ-dicarboxy diacid and decarboxylating the diacid to the corresponding vitamin A α-monoacid hereinafter referred to as vitamin A acid. Esterification of the monoacid gives an ester of vitamin A acid, and reduction of the monoacid ester or the monoacid itself yields vitamin A alcohol which can thereafter be esterified if desired.

β-ionone is a commercially available material having a 2,6,6-trimethyl cyclohexenyl ring joined to an unsaturated side chain which is in conjugation with the ring unsaturation. In the synthesis of vitamin A-active material from β-ionone, the β-ionone is first converted to β-ionylidene acetaldehyde. In the preferred embodiment, the conversion of β-ionone to β-ionylidene acetaldehyde is desirably effected by converting β-ionone to β-ionylidene acetic acid ester, reducing said ester to β-ionylidene ethanol, and oxidizing said β-ionylidene ethanol to β-ionylidene acetaldehyde.

We have discovered that β-ionylidene acetaldehyde readily condenses with β-methyl glutaconic anhydride, either with or without a catalyst, to give an anhydride condensation product of the formula

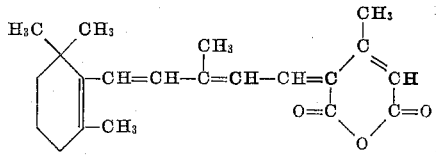

In the synthesis of vitamin A-active material in accordance with this invention, the anhydride condensation product is thereupon converted to the corresponding α,γ-diacid, such conversion being readily effected by successively saponifying and acidulating the condensation product. The diacid thus formed and having the chemical composition of vitamin A diacid is thereafter converted to vitamin A-active material, such conversion including as the initial step decarboxylating the diacid to the corresponding α-carboxy monoacid having the chemical composition of vitamin A acid.

In the synthesis of vitamin A-active material in accordance with a preferred embodiment, β-ionone is converted to β-ionolacetic acid ester by reacting β-ionone with a haloacetate in the presence of a metal, such metal being an active metal such as zinc or magnesium, to form an organo-metallic compound which is thereafter hydrolyzed to β-ionolacetic acid ester. Any of the haloacetates can be employed although the chloroacetates, bromoacetates and iodoacetates are preferred. The alkyl haloacetates, such as the methyl, ethyl, propyl, butyl or similar alkyl haloacetates are conveniently employed although any of the aliphatic or aromatic esters of a haloacetic acid are suitable since the particular ester group employed does not affect the course of the reaction nor the subsequent steps in the synthesis.

The hydroxy ester, β-ionolacetic acetic acid ester, is thereafter dehydrated to β-ionylidene acetic acid ester. Dehydration can be accomplished merely by heating the hydroxy ester but is desirably effected in the presence of a dehydration catalyst such as iodine, acids, acid salts, acid clays and similar well-known dehydration catalysts. Dehydration of β-ionolacetic acid ester usually results in formation of a mixture of the desired α,β-unsaturated β-ionylidene acetic acid ester and a β,γ-unsaturated desmotropic isomer thereof. For optimum yield, it is desirable to obtain a major proportion of the dehydration product in the α,β-unsaturated form. By effecting the dehydration in the presence of a dehydration catalyst having an acidic reaction under the conditions of dehydration and continuing the dehydration for a time substantially longer than necessary to effect dehydration, a substantial portion of the β,γ-unsaturated isomer is converted to the desired α,β-unsaturated compound until equilibrium proportions are attained. The β,γ-unsaturated isomer is desirably separated from the α,β-unsaturated compound and subjected to isomerization either separately or by recycling it through the dehydration step with additional hydroxy ester being dehydrated or both. By repeated separation, recycling and isomerizing, substantially all of the hydroxy ester is recovered in the form of the desired α,β-unsaturated β-ionylidene acetic acid ester. Typical catalytic materials having an acidic reaction under reaction conditions and acting to dehydrate the hydroxy ester and to isomerize the β,γ-unsaturated desmotropic isomer include acids such as the mineral acids, p-toluene sulfonic acid and the like; acid salts such as phosphorous oxychloride, phosphorous trichloride, zinc chloride, oxalyl chloride and the like; acid clays; iodine; and similar catalytic materials.

The dehydration product, β-ionylidene acetic acid ester is thereafter reduced to β-ionylidene ethanol. The reduction is readily accomplished in a preferred procedure by treating β-ionylidene acetic acid ester with an ether-soluble metal hydride effective to reduce unsaturated polyene esters without otherwise affecting the compound. Suitable ether-soluble metal hydrides include lithium aluminohydride, lithium borohydride and aluminum hydride. The reduction is effected by contacting the ester with the metal hydride in solvent medium and hydrolyzing the organo-metallic complex initially formed to the corresponding alcohol with aqueous acid.

The reduction product, β-ionylidene ethanol, is thereafter oxidized to β-ionylidene acetaldehyde. The oxidation is readily effected by reacting together β-ionylidene ethanol, a ketone such as acetone or diethyl ketone, and a primary aromatic amine such as aniline in the presence of a metal alkoxide, and hydrolyzing the product of such reaction to β-ionylidene acetaldehyde. Oxidation of β-ionylidene ethanol to β-ionylidene acetaldehyde in accordance with this procedure is described more fully in the copending application of Robeson and Eddinger, Serial No. 16,625, filed March 23, 1948, now United States Patent 2,507,647.

A particularly efficacious method of oxidizing β-ionylidene ethanol to β-ionylidene acetaldehyde comprises treating β-ionylidene ethanol with manganese dioxide. Reference is made to the copending applications of Robeson, Serial No. 157,621, and Robeson and Cawley, Serial No. 157,624, both of which were filed concurrently herewith and are concerned with other related methods of converting β-ionylidene acetaldehyde to vitamin A.

In accordance with this invention, β-ionylidene acetaldehyde is thereafter condensed with β-methyl glutaconic anhydride whereby an anhydride condensation product is formed having a β-ionylidene-methine substituent group in the 3-position on the β-methyl glutaconic anhydride. We have found that the condensation is readily effected in good yield either with or without a condensation catalyst. When a condensation catalyst is desired, any of the common basic condensation catalysts can be employed such as the alkali metal hydroxides, alkali metal alkoxides, basic amines, alkali metal hydrides, ammonium hydroxide, quaternary ammonium bases, alkali metals, and the like. The condensation is desirably effected in solvent media, any of the well-known organic solvents such as alcohols, ethers, hydrocarbons, etc. being suitable.

The anhydride condensation product is then converted to the corresponding α,γ-diacid having the chemical composition of vitamin A diacid. The conversion to the diacid is readily accomplished by saponifying the anhydride condensation product to form the corresponding dibasic acid salt, and acidulating the dibasic acid salt and thereby converting it to the diacid. The saponification is effected in accordance with well-known saponification techniques as by treating the condensation product with alkali. Acidulation of the dibasic acid salt to the dibasic acid is similarly effected according to well-known procedures as by treatment with aqueous mineral acid or the like. The α,γ-diacid thus obtained has the basic polyene structure of vitamin A-active material with the exception of the carboxy substituent on the γ-carbon atom.

The diacid is thereupon converted to the desired vitamin A-active material. The initial step in such conversion involves decarboxylating the diacid. The diacid is desirably decarboxylated to the vitamin A acid. Decarboxylation can be effected merely by heating the diacid. Preferably for optimum yield of the vitamin A acid, the decarboxylation is effected by heating the diacid in the presence of an organic base and more desirably also in the presence of a metal catalyst, such as a copper-bearing material.

Decarboxylation to vitamin A acid is desirably effected by heating the diacid at a temperature of from about 90° C. to about 175° although temperatures as low as 60° C. or lower and temperatures as high as 200° C. or higher can be employed in some cases. The time of heating will vary depending upon the temperature at which decarboxylation is effected but usually will be from about 15 minutes to about 3 hours. Decarboxylation is desirably effected in the presence of an organic base, which base is preferably a tertiary amine such as quinoline or pyridine or similar tertiary amine. Optimum yields of the desired vitamin A acid are obtained by employing a copper-bearing material in conjunction with the organic base. Suitable materials include copper powder, copper-bronze powder and copper salts and oxides, particularly efficacious results being obtained employing a copper compound such as copper acetate which can be employed with an organic base acting as solvent therefor. Other copper salts such as the chromites, chlorides, nitrates, etc. can be effectively employed. The decarboxylation is desirably effected under controlled conditions until the average composition of the decarboxylation product corresponds to the monoacid as determined by measurement of the evolved carbon dioxide by titration, pressure build-up or similar control procedure. The decarboxylation can be effected under milder conditions such that only the monoacid is formed in admixture with the diacid whereby the monoacid and diacid can be separated and the diacid recycled for further treatment.

The vitamin A acid formed by decarboxylation of the diacid has vitamin A biological activity. Desirably, however, the monoacid is converted to vitamin A alcohol or a vitamin A ester.

Reduction of the monoacid to vitamin A alcohol is readily effected by treating the monoacid with an ether-soluble metal hydride followed by hydrolysis as described hereinabove with regard to the preparation of β-ionylidene ethanol. The reduction is desirably effected employing an ester of the monoacid, vitamin A acid esters being readily prepared from the monoacid by conventional esterification procedures, as for example by treatment with an alkyl halide. The esterification is desirably carried out in such manner that isomerization as regards unsaturation is obviated, such esterification without isomerization being effected by treating the monoacid with an alkyl halide in the presence of methyl ethyl ketone, an alkali-metal halide, and an alkali carbonate. The vitamin A acid esters thus formed possess vitamin A biological activity. The esterification further serves to facilitate separation of monoacid from undecarboxylated diacid since the monoacid esterifies in preference to the diacid. In a preferred embodiment, the esters are reduced to vitamin A alcohol by treatment with an ether-soluble metal hydride, such as lithium aluminohydride, lithium borohydride or aluminum hydride, followed by hydrolysis with aqueous acid. Vitamin A alcohol thus formed can be esterified to vitamin A ester if desired as by treatment with an acyl halide such as palmitoyl chloride, acetyl chloride or the like in accordance with well-known esterification processes.

The vitamin A-active material prepared in accordance with this invention usually consists of a substantial portion and often a major portion of the cis isomer. It should be noted that vitamin A-active materials exist in both the cis and trans forms, natural vitamin A esters comprising a major proportion of the trans isomer and a minor proportion of the cis isomer. If desired, at least a portion of the cis isomer can be converted to the trans form by isomerization of the monoacid, the monoacid ester, the vitamin A alcohol or an ester of such alcohol. Cis-trans isomerization is readily effected by refluxing in a solvent or by catalysis in solvent medium with iodine or a trace of acidic material or similar isomerization catalyst either at room temperature or elevated temperature.

The following examples illustrate certain preferred embodiments of the invention.

Example 1

Ninety-six grams of β-ionone, 96 g. of ethyl bromoacetate, 37.6 g. of zinc foil, 250 ml. of benzene, and a crystal of iodine were mixed together and refluxed until reaction began. The heat of reaction maintained reflux; and, when the evolution of heat ceased, the mixture was refluxed for an additional 30 minutes. The reaction mixture was cooled, shaken with an excess of 5% hydrochloric acid, and the benzene layer was separated and washed successively with water and dilute sodium carbonate solution. The benzene layer was then dried over sodium sulfate and the benzene removed by evaporation. The residue was distilled in a high vacuum still to give β-ionolacetic acid ethyl ester as a pale yellow viscous oil having $$E_{1\,cm.}^{1\%} (231\ m\mu) = 200$$

Example 2

A 14.8 g. portion of β-ionolacetic acid ethyl ester was dissolved in 65 cc. of benzene, a small crystal of iodine added and the mixture refluxed for 30 minutes. The benzene solution was washed successively with dilute sodium thiosulfate and water, dried and the solvent evaporated. After purification, the dehydration product had an absorption maximum at 284mu and comprised a mixture of α,β-unsaturated β-ionylidene acetic acid ethyl ester and the β,γ-unsaturated isomer thereof.

Example 3

Dehydration of β-ionolacetic acid ethyl ester and isomerization of part of the β,γ-unsaturated isomer formed in admixture with the desired α,β-unsaturated ester is illustrated by the following procedure. A 14.8 g. portion of β-ionolacetic acid ethyl ester was dissolved in 106 cc. of benzene and mixed with 0.5 cc. of phosphorous oxychloride dissolved in 42 cc. of benzene. The resulting mixture was refluxed for one hour, which was substantially longer than the reflux time necessary to effect dehydration alone. The mixture was then cooled, passed through 15 g. of sodium aluminum silicate adsorbent and the adsorbent washed with 100 cc. of benzene. After removal of the benzene under vacuum, the residue was dissolved in 100 cc. of petroleum ether and passed through a column (2"x20") packed with finely divided sodium aluminum silicate. The column was then washed with 1800 cc. of petroleum ether and the ether collected, combined with the original filtrate, and evaporated, leaving 8 g. of β-ionylidene acetic acid ethyl ester. After purification the product has $$E_{1\,cm.}^{1\%} (256\ m\mu) = 450$$

and $$E_{1\,cm.}^{1\%} (304\ m\mu) = 552$$

The column was thereafter eluted with 1300 cc. of acetone to remove the adsorbed β,γ-unsaturated isomer of β-ionylidene acetic acid ethyl ester from the adsorbent. The acetone was evaporated off, leaving a residue of 6.5 g. of the β,γ-unsaturated isomer. This was dissolved in 35 cc. of benzene and 0.21 cc. of phosphorous oxychloride in 30 cc. of benzene was added thereto. The mixture was refluxed for six hours, cooled washed repeatedly with water, dried over sodium sulfate, filtered and the solvent removed by evaporation. The residue consisted of 6.4 g. of a mixture of β-ionylidene acetic acid ethyl ester and the β,γ-unsaturated isomer thereof. The residue was dissolved in 50 cc. of petroleum ether and passed through an adsorption column as before. After washing the column with 600 cc. of petroleum ether, the ether fractions were combined and the solvent evaporated to yield 3 g. of β-ionylidene acetic acid ethyl ester. Further recycling and retreatment of the β,γ-unsaturated isomer gives substantially complete recovery of α,β-unsaturated β-ionylidene acetic acid ethyl ester. Similar results are obtained with other dehydration and isomerization catalysts such as the mineral acids, phosphorus tricholoride, iodine, p-toluene sulfonic acid, zinc chloride, acid clays, oxalyl chloride and similar materials exhibiting acidic characteristics under reaction condition.

Example 4

The reduction of β-ionylidene acetic acid ester to β-ionylidene ethanol is readily effected by means of treatment with an ether-soluble metal hydride. For example, 4.6 g. of ethyl β-ionylidene acetate was dissolved in 60 ml. of dry ether and 50 cc. of a 0.4 N. ethereal solution of lithium aluminum hydride was added over a period of two minutes. The mixture was stirred for 5 minutes, diluted with 100 cc. of 5% hydrochloric acid, and the ether layer washed with water, dried with sodium sulfate and the solvent removed by evaporation. The residue of β-ionylidene ethanol weighed 4.0 g. and had $$E_{1\,cm.}^{1\%} (265\ m\mu) = 534\ (\text{in ethanol})$$

Example 5

The oxidation of β-ionylidene ethanol to β-ionylidene acetaldehyde was effected as follows. A 0.5 g. portion of β-ionylidene ethanol was dissolved in 3 cc. of dry benzene containing 0.75 g. of aluminum tert.-butoxide and 1 cc. of aniline. To the resulting mixture was added 2 cc. of diethyl ketone, and the mixture was heated under reflux at 110° C. for 16 hours. The reaction product was treated with 30 cc. of 5% hydrochloric acid, and extracted with ether. The ether extract was washed successively with dilute hydrochloric acid, 5% sodium bicarbonate solution and water. The ether extract was dried with sodium sulfate and the solvent removed by evaporation to give 0.48 g. of β-ionylidene acetaldehyde. After purification by chromatography, the product had $$E_{1\,cm.}^{1\%} (272\ m\mu) = 540$$

and $$E_{1\,cm.}^{1\%} (326\ m\mu) = 676$$

The 2,4 dinitrophenyl hydrazone of the aldehyde melted at 198–200° C. and had $$E_{1\,cm.}^{1\%} (405\ m\mu) = 990$$

Similar results are obtained with other aluminum or magnesium alkoxides, other primary aromatic amines, and other ketones.

Example 6

A particularly efficacious method of oxidizing β-ionylidene ethanol to β-ionylidene acetaldehyde involves the use of manganese dioxide as oxidizing agent. In a typical procedure, a 30 g. portion of β-ionylidene ethanol having a purity of $$85\%\ (E_{1\,cm.}^{1\%} (267\ m\mu) = 516)$$

was dissolved in 300 cc. of methylene chloride. To the resulting solution was added 79 g. of finely powdered manganese dioxide prepared by the interaction of manganous sulfate and potassium permanganate. Oxidation of the β-ionylidene ethanol was effected by allowing the resulting mixture to stand for 22 hours at about 25° C. The mixture was then filtered to remove manganese dioxide and the solvent evaporated from the filtrate. The concenrate of β-ionylidene acetaldehyde obtained thereby weighed 27.9 g. and had $$E^{1\%}_{1\text{ cm.}} (326 \text{ m}\mu) = 407$$

Example 7

A solution was prepared comprising 0.53 g. of β-methyl glutaconic anhydride and 0.92 g. of β-ionylidene acetaldehyde dissolved in 50 cc. of benzene. To this solution was added 0.3 cc. of a 10% solution of potassium hydroxide in ethyl alcohol. The reaction mixture turned dark red and, after standing for 20 hours at about 25° C., the mixture was washed with dilute sulfuric acid and water. The mixture was dried over sodium sulfate and the solvent removed by evaporation leaving a residue of dark red oil which had $$E^{1\%}_{1\text{ cm.}} (428 \text{ m}\mu) = 682$$

Crystallization from ethyl alcohol gave 0.43 g. of dark red needles having a melting point of 129–130° and $$E^{1\%}_{1\text{ cm.}} (430 \text{ m}\mu) = 1090$$

The anhydride condensation product showed no depression in melting point when mixed with an anhydride prepared by condensing β-ionylidene acetaldehyde with ethyl β-methyl glutaconate and converting the condensation product to the anhydride by treatment with acetyl chloride in ether solution.

Example 8

The condensation of β-ionylidene acetaldehyde and β-methyl glutaconic anhydride also proceeds satisfactorily without the use of a basic condensation catalyst. Thus, 1.2 g. of β-methyl glutaconic anhydride and 3.2 g. of a 55% concentrate of β-ionylidene acetaldehyde were dissolved in 95 cc. of benzene, and the benzene immediately evaporated under a stream of nitrogen to yield 4.4 g. of dark red oil which had $$E^{1\%}_{1\text{ cm.}} (430 \text{ m}\mu) = 478$$

The product was crystallized from ethyl alcohol to give dark red needles having a melting point of 129–130° C. and $$E^{1\%}_{1\text{ cm.}} (430 \text{ m}\mu) = 1090$$

Example 9

Conversion of the anhydride condensation product to an α,γ-vitamin A diacid is readily effected by successive saponification and acidulation. For example, 0.4 g. of the crystalline vitamin A diacid anhydride, as prepared in Examples 7 and 8, was saponified by heating it for 45 minutes at 75° C. with 8 cc. of 1 N. potassium hydroxide and 2 cc. of ethyl alcohol. The alkaline solution was then acidified with dilute hydrochloric acid and the diacid thus formed was extracted out with ether. Crystallization of the product from a petroleum ether-ethyl ether mixture yielded yellow crystals of α,γ-vitamin A diacid having a melting point of 181.5–183° C.

Example 10

The α,γ-vitamin A diacid can be decarboxylated by heating. Decarboxylation to vitamin A acid is desirably effected, however, by heating the diacid in the presence of an organic base. Thus decarboxylation to the monoacid was effected by heating a mixture of 3.4 g. of α,γ-vitamin A diacid and 12 ml. of quinoline for 40 minutes at 150–160° C. The mixture was then cooled, acidified and extracted with ether. The ether extract was in turn extracted with 4% aqueous sodium hydroxide, and the basic extract was acidified to give a reddish-brown, brittle glassy solid product. This glassy solid was then crystallized from alcohol to give reddish-brown prismatic crystals of vitamin A acid having a melting point of 169–170.5° C. and $$E^{1\%}_{1\text{ cm.}} (352 \text{ m}\mu) = 1280$$

Example 11

Optimum formation of the desired vitamin A acid is effected by decarboxylating the diacid in the presence of a tertiary amine and a copper-bearing material. For example, a solution of 2.0 g. of α,γ-diacid in 10 cc. of pyridine containing 0.1 g. of powdered copper was refluxed for 90 minutes. The solution was cooled, diluted with 50 cc. of ethyl ether, and washed with dilute hydrochloric acid, water, and 0.5 N. potassium hydroxide in turn. The alkaline solution obtained by washing with potassium hydroxide was separated, acidified with dilute hydrochloric acid, and extracted with ether. The ether extract was washed, dried and the ether removed by evaporation. The vitamin A acid product, after crystallization, had $$E^{1\%}_{1\text{ cm.}} (353 \text{ m}\mu) = 1300$$

Example 12

A 0.5 g. portion of vitamin A acid was dissolved in 50 cc. of anhydrous ether. To this solution was added 4 cc. of 1 N. solution of lithium aluminohydride in anhydrous ether. The mixture was refluxed gently for 3 minutes and then acidified with dilute hydrochloric acid. The ether solution was washed successively with dilute hydrochloric acid, 0.5 N. potassium hydroxide and water, dried over sodium sulfate, filtered, and the ether removed by evaporation. The vitamin A alcohol product was a yellow oil weighing 0.47 g. and having $$E^{1\%}_{1\text{ cm.}} (326 \text{ m}\mu) = 1125$$

The product had a vitamin A potency of 1,930,000 units per gram as determined by chemical assay and bioassay.

Example 13

Esterification of vitamin A acid without isomerization due to shifting unsaturation is effected as follows. A 10 g. portion of vitamin A acid concentrate was mixed with 48 cc. of methyl ethyl ketone, 6.7 cc. of ethyl bromide, 2.4 g. of potassium carbonate and 0.03 g. of sodium iodide. The resulting mixture was refluxed for 4 hours at 70–75° C. and thereafter the methyl ethyl ketone was evaporated off and the mixture acidified with dilute hydrochloric acid. Vitamin A acid ethyl ester was recovered by extraction with isopropyl ether and evaporation of the ether from the extract.

Example 14

Ten grams of vitamin A acid ethyl ester were dissolved in 38 cc. of anhydrous ethyl ether. To this solution was slowly added 65 cc. of anhydrous ether containing 1.2 g. of lithium aluminohydride. After 5 minutes, the reaction mixture was diluted with water and washed successively with dilute hydrochloric acid, sodium bicarbonate solution and water. The ether solution was filtered, dried, and the ether removed by evaporation. The vitamin A alcohol concentrate obtained as product had a vitamin A potency of 1,650,000 units per gram.

Example 15

Vitamin A-active material prepared in accordance with this invention usually comprises a major proportion of material in the cis form. A typical procedure for isomerizing cis-vitamin A acid to trans-vitamin A acid is as follows. A 0.25 g. portion of α-carboxy monoacid, as prepared in Example 11, was dissolved in 50 cc. of benzene containing 0.3 mg. of iodine. The solution was exposed to sunlight for 3 hours at room temperature and the iodine removed with sodium thiosulfate. The benzene was removed by evaporation to give a residue having $$E^{1\%}_{1\text{ cm.}} (240 \text{ m}\mu) = 248$$

and $$E^{1\%}_{1\text{cm.}} (350 \text{ m}\mu) = 1510$$

corresponding to a ratio of trans- to cis-vitamin A acid of 74:26.

*Example 16*

The isomerization of cis- to trans-vitamin A is desirably carried out employing an ester of cis-vitamin A alcohol. Esters are readily prepared by reacting cis-vitamin A alcohol with an acyl halide such as acetyl chloride, palmitoyl chloride or the like. The isomerization is effected in a typical process by refluxing the cis ester in an organic solvent such as naphtha. The isomerization proceeds more rapidly employing a trace of acid or iodine as isomerization catalyst. For example, 1 g. of a concentrate of cis-vitamin A palmitate having $$E^{1\%}_{1\text{cm.}} (328 \text{ m}\mu) = 615$$

was dissolved in 10 cc. of benzene containing 2.5 mg. of dissolved iodine. The solution was allowed to stand for 45 minutes at room temperature, and thereafter the iodine was removed by passing the solution by evaporation. Chemical assay showed the residue to contain a 68:32 ratio of trans-vitamin A palmitate to cis-vitamin A palmitate. The procedure was repeated employing 5 mg. of iodine and a reaction period of 2 hours. The trans- to cis- ratio in the product was 88:12.

*Example 17*

Isomerization of cis compound to trans compound can also be effected with the cis-vitamin A alcohol. A solution of 0.5 g. of cis-vitamin A alcohol in refined cottonseed oil was dissolved in 2 cc. of benzene containing 0.2 mg. of iodine. The mixture was allowed to stand for 2 hours at room temperature, the iodine removed with sodium thiosulfate and the solvent removed by evaporation. Chemical assay showed a trans-vitamin A alcohol to cis-vitamin A alcohol ratio of 82:18.

This invention thus provides a new and useful method of synthesizing vitamin A-active materials from ionylic compounds by a new combination of operable chemical steps.

While the invention has been described in considerable detail with reference to certain preferred embodiments, it will be understood that variations and modifications can be effected without departing from the spirit and scope of the invention as described hereinabove and as defined in the appended claims.

What we claim is:

1. The method of synthesizing vitamin A alcohol which comprises, in combination, the sequential steps of condensing β-ionylidene acetaldehyde with β-methyl glutaconic anhydride, saponifying the product of said condensing, acidulating the product of said saponifying, decarboxylating the resulting compound, vitamin A α,γ-diacid, by heating said vitamin A α,γ-diacid with a mixture of an organic base and a copper compound at a temperature of 60–200° C. until said vitamin A α,γ-diacid is converted to vitamin A α-monoacid, and reducing said vitamin A α-monoacid to vitamin A alcohol with an ether-soluble metal hydride.

2. The method of synthesizing vitamin A alcohol which comprises the combination of sequential steps of condensing β-ionylidene acetaldehyde with β-methyl glutaconic anhydride, converting the resulting condensation product to the corresponding compound, vitamin A α,γ-diacid, by subjecting said condensation product to saponification and acidulation, decarboxylating said vitamin A α,γ-diacid to the corresponding vitamin A α-monoacid by heating said vitamin A α,γ-diacid at a temperature of 60–200° C. in admixture with a tertiary amine and a copper compound until carbon dioxide is evolved in an amount corresponding to decarboxylation of said vitamin A α,γ-diacid to said vitamin A α-monoacid and reducing said vitamin A α-monoacid to vitamin A alcohol by treatment with an ether-soluble metal hydride.

3. The method of synthesizing vitamin A alcohol which consists of the combination of sequential steps of condensing β-ionylidene acetaldehyde with β-methyl glutaconic anhydride, saponifying the resulting condensation product, acidulating the product of said saponifying to form vitamin A α,γ-diacid, heating said vitamin A α,γ-diacid in admixture with a tertiary amine and a copper compound at a temperature within the range of 60–200° C. until carbon dioxide is evolved in an amount sufficient for decarboxylation of said diacid to vitamin A α-monoacid, esterifying said vitamin A α-monoacid, and reducing the resulting ester to vitamin A alcohol with lithium aluminum hydride.

4. The method of synthesizing vitamin A alcohol which consists of the combination of sequential steps of condensing β-ionylidene acetaldehyde with β-methyl glutaconic anhydride, saponifying the resulting condensation product, acidulating the product of said saponifying to vitamin A α,γ-diacid, heating said vitamin A α,γ-diacid in admixture with a tertiary amine and a copper compound soluble in said tertiary amine, at a temperature of 90–175° C. until said vitamin A α,γ-diacid is decarboxylated to vitamin A α-monoacid, esterifying said vitamin A α-monoacid, and reducing the resulting ester of said vitamin A α-monoacid to vitamin A alcohol with an ether-soluble metal hydride.

5. The method of synthesizing vitamin A alcohol which comprises condensing β-ionylidene acetaldehyde with β-methyl glutaconic anhydride, saponifying the resulting condensation product, acidulating the product of said saponifying, heating the vitamin A α,γ-diacid thereby obtained in admixture with a tertiary amine and a copper salt of a fatty acid at a temperature of 90–175° C. and thereby forming vitamin A α-monoacid, esterifying said vitamin A α-monoacid, and reducing the resulting ester of vitamin A α-monoacid to vitamin A alcohol with an ether-soluble metal hydride.

6. The method of synthesizing vitamin A alcohol which consists of condensing β-ionylidene acetaldehyde with β-methyl glutaconic anhydride, saponifying the resulting condensation product, acidulating the product of said saponifying to form vitamin A α,γ-diacid, heating said vitamin A α,γ-diacid in admixture with a tertiary amine and copper acetate at a temperature of 90–175° C. until carbon dioxide is evolved in an amount corresponding to decarboxylation of said vitamin A α,γ-diacid to vitamin A α-monoacid, esterifying said vitamin A α-monoacid, and reducing the resulting ester to vitamin A alcohol with lithium aluminum hydride.

References Cited in the file of this patent

UNITED STATES PATENTS

| | | |
|---|---|---|
| 2,233,375 | Kuhn | Feb. 25, 1941 |
| 2,369,158 | Milas | Feb. 13, 1945 |
| 2,381,882 | Cupery | Aug. 14, 1945 |
| 2,414,722 | Cornwell | Jan. 21, 1947 |
| 2,424,994 | Milas | Aug. 5, 1947 |
| 2,507,647 | Robeson et al. | May 16, 1950 |
| 2,515,901 | Schwartzkopf et al. | July 18, 1950 |
| 2,529,498 | Isler | Nov. 14, 1950 |
| 2,576,103 | Cawley et al. | Nov. 27, 1951 |
| 2,583,594 | Robeson | Jan. 29, 1952 |

OTHER REFERENCES

Adams, "Organic Reactions," vol. 1, John Wiley & Sons, New York (1942), pgs. 226–227.

Arens et al., Nature, vol. 157, pgs. 190–191 (1946), 2 pages.

Heilbron, J. Chem. Soc. (London), 1948, pgs. 386–393.

Wendler et al., J. American Chem. Society, vol. 73, pgs. 719–724, February 1951.

Feist et al., Beilstein Handbuch (4th Ed.), vol. 7, pgs. 192, 193 (1924), 2 pages.